United States Patent [19]
Morgan et al.

[11] Patent Number: 5,122,238
[45] Date of Patent: Jun. 16, 1992

[54] EFFICIENT ELECTROLYTIC METHOD OF MAKING CHROMIC ACID FROM SODIUM BICHROMATE

[75] Inventors: Russell J. Morgan, Grand Island; Robert L. Zeller, III, Youngstown, both of N.Y.; Ursula I. Keller, Queenston, Canada

[73] Assignee: Occidental Chemical Corporation, Niagara Falls, N.Y.

[21] Appl. No.: 712,770

[22] Filed: Jun. 10, 1991

[51] Int. Cl.$^5$ .............................................. C25B 1/22
[52] U.S. Cl. .................................. 204/97; 204/89; 423/57; 423/595; 423/607
[58] Field of Search ............... 204/89, 97, 98; 423/57, 423/575, 607

[56] References Cited
U.S. PATENT DOCUMENTS

| | | | |
|---|---|---|---|
| 4,144,145 | 3/1979 | Watanabe et al. | 204/97 |
| 4,273,628 | 6/1981 | Kidon et al. | 204/97 |
| 4,290,864 | 9/1981 | Shuster et al. | 204/97 |

FOREIGN PATENT DOCUMENTS 625706 12/1962 Belgium .
739447 7/1966 Canada .

Primary Examiner—T. Tung
Assistant Examiner—David G. Ryser
Attorney, Agent, or Firm—James F. Tao; Richard D. Fuerle

[57] ABSTRACT

Disclosed is a method of making chromic acid by electrolyzing an aqueous solution of sodium bichromate until the sodium bichromate is converted to chromic acid at a bichromate percent conversion of about 1 to about 48.4. Sulfuric Acid is then added to the aqueous solution in an amount between stoichiometric and about 30 wt % in excess of stoichiometric to convert the remaining sodium bichromate to chromic acid. This results in the precipitation of chromic acid, which is separated from the aqueous solution.

19 Claims, 3 Drawing Sheets

EFFICIENT ELECTROLYTIC METHOD OF MAKING CHROMIC ACID FROM SODIUM BICHROMATE

BACKGROUND OF INVENTION

This invention relates to a process for economically recovering chromic acid from a bichromate solution. In particular, it relates to a process in which a bichromate solution is partially converted in an electrolytic cell at a conversion below that typically required for selective crystallization through evaporation and/or crystallization.

At the present, there are two principal commercial manufacturing methods for converting sodium bichromate into chromic acid. In the electrolytic method, an aqueous solution of sodium bichromate is electrolyzed. After a certain amount of the sodium bichromate is converted into chromic acid, the recovery of $CrO_3$ from the solution is possible through evaporative crystallization or evaporation followed by cooling. This method has the advantage of not producing byproducts that must be recycled or disposed of, but, because of the high acidity of the solution which results from the degree of electrochemical conversion required in order to recover $CrO_3$ selectively, it uses large amounts of electricity and is very expensive. See Canadian Pat. No. 739,447 and U.S. Pat. No. 4,273,628, herein incorporated by reference.

In the sulfuric acid method of producing chromic acid from sodium bichromate, an aqueous solution of sodium bichromate is mixed with sulfuric acid, forming chromic acid, which precipitates, with or without evaporation, before or after adding sulfuric acid, and sodium bisulfate. While the sulfuric acid method is less expensive than the electrolytic method, it generates a sodium bisulfate stream which must be recycled back to the chromate process or disposed of. See U.S. Pat. No. 4,290,864, herein incorporated by reference.

SUMMARY OF THE INVENTION

We have discovered that chromic acid can be made from sodium bichromate at a lower electrical cost than the electrolytic method and with less production of sodium bisulfate than the sulfuric acid method. In our process, the sodium bichromate solution is only partially electrolyzed, and insufficient chromic acid is produced to selectively precipitate. We have found that the electrolytic process is very efficient at converting sodium bichromate to chromic acid when the sodium bichromate concentration is high and the chromic acid concentration is low, but that it becomes less and less efficient as more and more sodium bichromate is converted into chromic acid. In fact, we have found that at preferred sodium bichromate percent conversions we can obtain current efficiencies of close to 100%.

The remaining sodium bichromate is then converted into chromic acid by the addition of sulfuric acid Because, in the process of this invention, the electrolytic method is used to convert only a portion of the sodium bichromate into chromic acid, less sodium bisulfate is generated in the subsequent sulfuric acid treatment, which minimizes the amount of bisulfate returned to the bichromate process, the amount of by-product salt cake generated, and the cost of bisulfate disposal.

Another advantage of the process of this invention is that many of the impurities that are in the bichromate liquor are removed in the electrolytic portion of the process. For example, chlorides, which can reduce chromium +6 to chromium +3 in concentrated chromic acid solution, move to the anode where they are removed as chlorine. Trivalent chromium and trace metals move to the cathode where they are removed as hydroxides. Thus, the resulting chromic acid crystals tend to be pure than they would be if produced by the sulfuric acid method.

DESCRIPTION OF THE INVENTION

Figure 1:
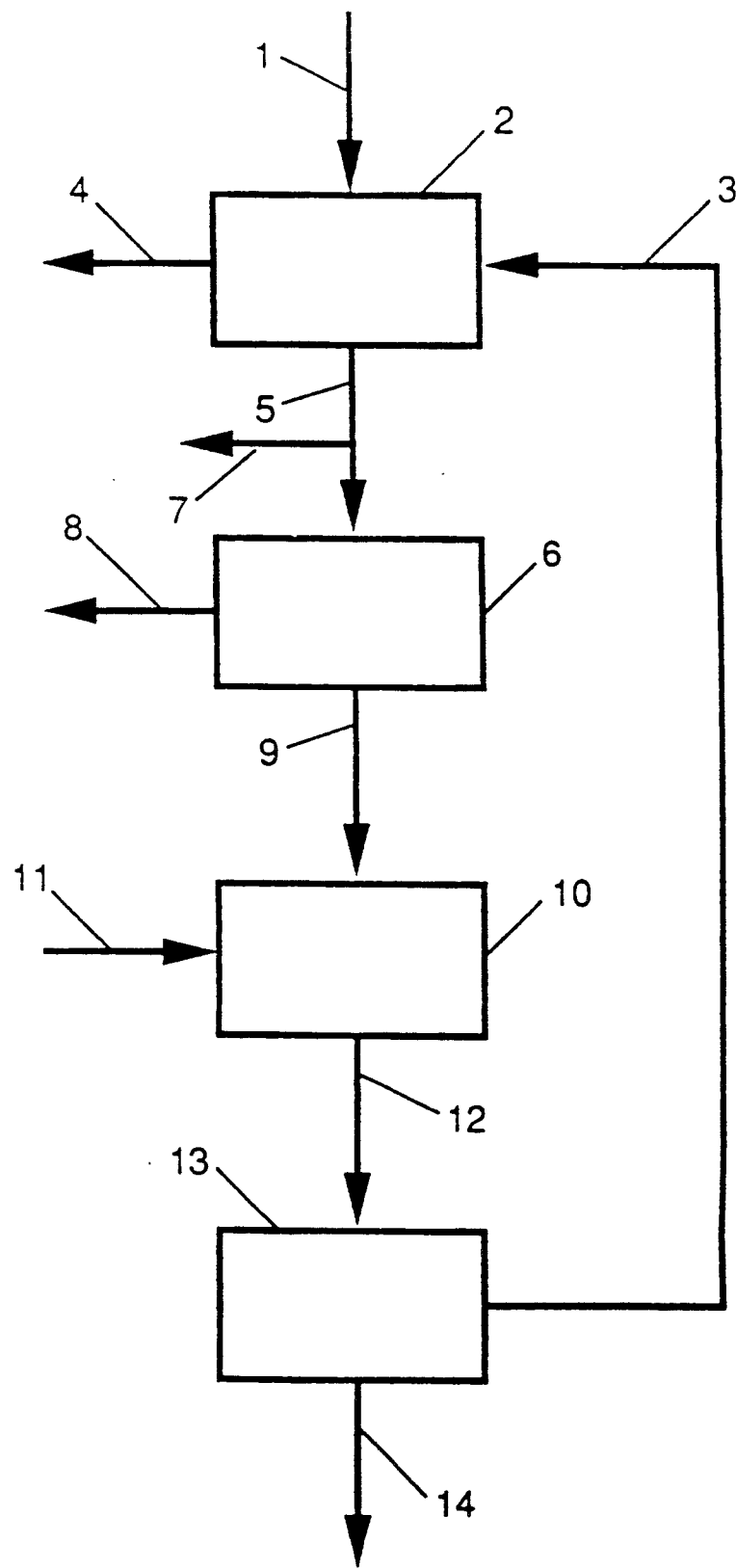
FIG. 1 is a block diagram illustrating a certain preferred embodiment of the process of this invention.

In FIG. 1, an aqueous solution of sodium chromate in line 1 enters evaporation area 2. There, recycled liquor from line 3 is mixed with the sodium chromate liquor and water is evaporated, resulting in the precipitation of sodium sulfate, which is removed through line 4, and the production of sodium bichromate. The bichromate liquor then passes through line 5 to the anolyte compartment of electrolytic cell 6. Excess bichromate liquor can be taken off line 5 through line 7. Partial electrolysis results in the production of sodium hydroxide in the catholyte compartment (removed through line 8) and in a mixture of sodium bichromate and chromic acid in the anolyte compartment, which passes through line 9 to chemical reactor 10. There, excess sulfuric acid from line 11 is added, resulting in the conversion of all of the remaining sodium bichromate into chromic acid, which precipitates. The resulting slurry passes through line 12 and is filtered by filter 13. The crude chromic acid crystals are removed through line 14 and the filtrate is recycled through line 3.

While aqueous sodium bichromate solutions of almost any concentration can be used in this invention, it is preferable to use a sodium bichromate solution having a concentration of about 30 wt% up to saturation because the process of the invention is more efficient with more concentrated solutions.

The electrolytic cell used in this invention should have an anolyte compartment and a catholyte compartment separated by a membrane that permits the passage of sodium ions from the anode to the cathode while minimizing the movement of hydroxyl ions. Such membranes are commercially available. While a two-compartment membrane cell is preferred, one could also use a three-compartment cell or a diaphragm cell.

The sodium bichromate solution is admitted to the anolyte compartment and water to the catholyte compartment of the electrolytic cell and electrolysis proceeds, converting the water on both sides of the cell into acid ($H^+$) and base ($OH^-$) respectively. Because of the passage of current, $Na^+$ ions are transported from the anolyte compartment to the catholyte compartment where NaOH is formed in the catholyte and $CrO_3$ is formed in the anolyte. The electrolytic conversion of sodium bichromate into chromic acid can be described by the equation:

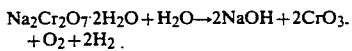

Sodium hydroxide formed in the catholyte compartment is removed and replaced with fresh water. Alternatively, carbon dioxide can be added to the catholyte to make sodium bicarbonate or carbonate, which can be concentrated, recovered, and used, for example, as feed alkali to a chromate process.

The amount of sodium bichromate converted into chromic acid is the bichromate percent conversion (BPC) which is equal to $$\frac{149\,[CrO_3]}{1.49[CrO_3] + [Na_2Cr_2O_7 \cdot 2H_2O]}$$

where the concentrations are typically in grams/liter. In this invention, the conversion of bichromate to chromic acid in the electrolytic cell must be terminated before the concentration of chromic acid has increased to the point where it precipitates. We have found that no chromic acid can be selectively crystallized from the solution if the BPC is less than about 48.4@30° C. For solutions having a BPC greater than 53.3, chromic acid can be selectively crystallized until the liquor reaches a composition where the BPC is about 53.3, at which time no further crystallization will occur. The region between 48.4 and 53.3 is a metastable-transition region where no reproducable data was obtained. See F. A. H. Schreinmakers, *Zeitschrift f. Physic Chemie*, Vol. 55, pages 71 to 95 (1905). Thus, the electrolytic portion of this invention must cease when the BPC is between 1 and about 48.4 and should preferably cease at a BPC between 1 and about 38. The highest electrolytic efficiencies, however, are obtained at a BPC of about 5 to about 15, and that is the most preferred BPC. The BPC can be determined as the electrolysis proceeds by doing an acid-base titration of the anolyte and catholyte solutions. It is highly preferable to run the electrolytic cell as a continuous process, though it is possible to run it as a batch process. In a continuous process, if the BPC is too high, the feed rate of the bichromate liquor can be increased or the current to the cell can be reduced.

Once the desired BPC has been reached, the anolyte is removed from the cell and is mixed with sulfuric acid in an amount from about stoichiometric to about 30 wt% in excess of stoichiometric, according to the equation:

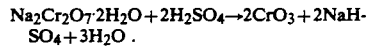

At an appropriate solution strength the conversion of the sodium bichromate into chromic acid results in the precipitation of chromic acid which can be removed by, for example, filtration. If the concentration of chromic acid does not exceed saturation, the solution can be concentrated by evaporation either before, during, or after the addition of the sulfuric acid If the sodium bichromate concentration is at least about 65 wt% chromic acid will precipitate. The filtrate contains sodium bisulfate, excess sulfuric acid, and a small amount of chromic acid. It can be used in a sodium bichromate process to convert sodium chromate to sodium bichromate, as shown in FIG. 1.

The chromic acid filtered off can be used in a variety of ways. Typically, it is heated until it melts. Two layers form, chromic acid on the bottom and sodium bisulfate on the top. The bottom layer of chromic acid is drained off and can be used for chromium plating, decorative and hard chrome, as a component in pressure treated wood preservatives, etc.

The sodium bisulfate top layer is used in the bichromate process to consume excess alkalinity in the sodium chromate generated in the kiln. invention.

The following examples further illustrate this invention.

EXAMPLE 1

Figure 2:
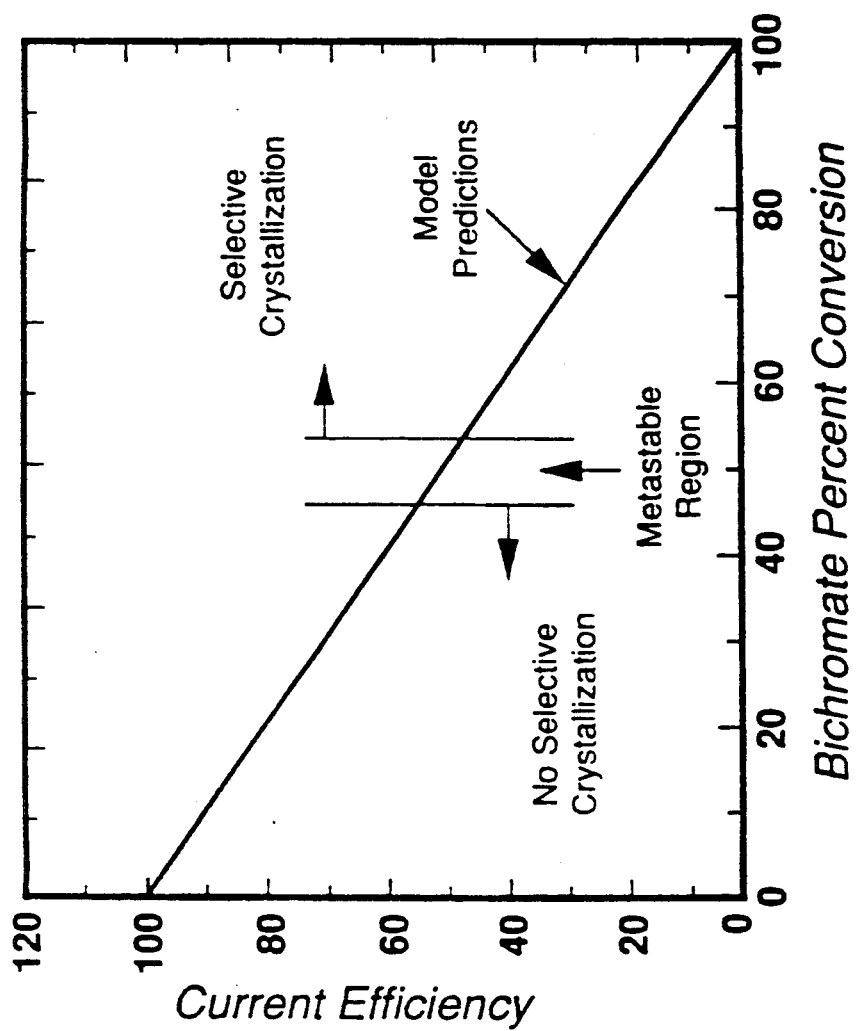
FIG. 2 is an experimentally derived graph showing the current efficiency of the electrolytic process in converting sodium bichromate into chromic acid as a function of the bichromate percent conversion.

Two different continuous two-compartment membrane cells were equipped with a perfluorinated membrane sold by Dupont under the trademark "Nafion 417" and were operated with a sodium bichromate concentration in the anolyte compartment of 69 to 70% and a catholyte water feed adjusted to maintain approximately 40 g/l NaOH. The current and feed rates were adjusted to obtain various bichromate percent conversions as determined by acid-base analysis of the anolyte and catholyte. Current efficiencies were calculated by determining the amp-hours of electrolysis, the concentrations of the anolyte and catholyte, and the total volume collected. FIG. 2 gives the results. FIG. 2 shows that current efficiency falls as bichromate percent conversion increases. Extrapolation of the curve indicates that at BPC's below about 15% the current efficiency is about 100%. The regions shown in FIG. 2 where chromic acid can be selectively crystallized at 30° C. were taken from F. A. H. Schreinmakers, id. Because the current efficiencies were identical for BPC's adjusted by feed rate and current density, the main loss of efficiency is due to diffusion of $H^+$ across the membrane. Migration of $H^+$, due to the presence of an electric field, has a neglible effect.

EXAMPLE 2

Figure 3:
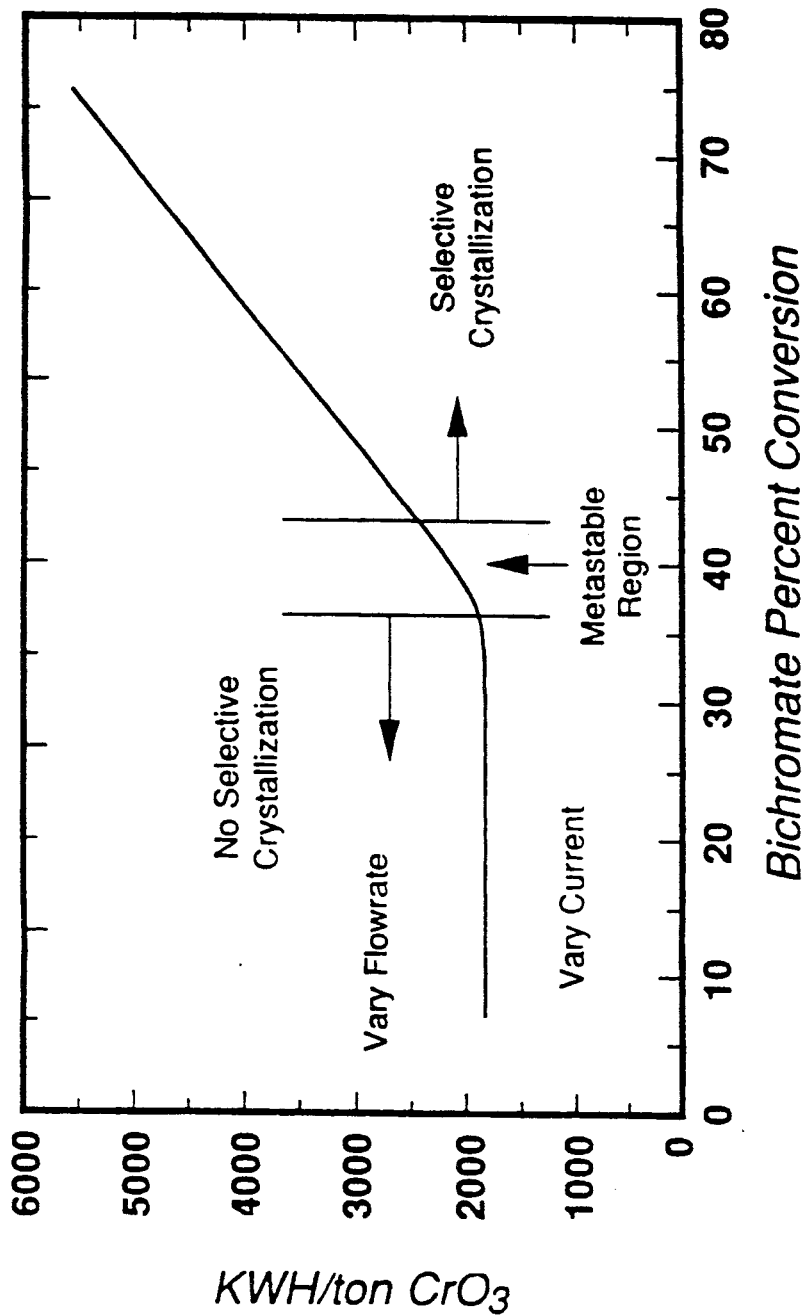
FIG. 3 is an experimentally derived graph showing the kilowatt hours per ton of chromic acid produced by the electrolytic process as a function of the bichromate percent conversion.

The data obtained from two of the cells used in Example 1 were recalculated to give the kilowatt hours per ton of chromic acid produced at various BPC's. FIG. 3 gives the results. FIG. 3 shows that the kilowatt hours per ton of chromic acid increases as the BPC increases, and that the greatest cell efficiencies are obtained at lower BPC's. The plateau at 1700 KwH/ton is due to increased voltage offsetting the higher current efficiencies.

We claim:

1. A method of making chromic acid comprising
   (A) electrolyzing an aqueous solution of sodium bichromate until said sodium bichromate is converted into chromic acid at a bichromate percent conversion of about 1 to about 48.4; and
   (B) adding sulfuric acid to said aqueous solution in an amount between stoichiometric and about 30 wt% in excess of stoichiometric, to convert sodium bichromate remaining in said solution into chromic acid and to precipitate chromic acid;
2. A method according to claim 1 wherein said bichromate percent conversion is about 1 to about 38.
3. A method according to claim 2 wherein said bichromate percent conversion is about 5 to about 15.
4. A method according to claim 1 wherein said aqueous solution is the anolyte of a two compartment membrane cell.
5. A method according to claim 1 wherein the concentration of said sodium bichromate solution is about 30 wt% up to saturation.

6. A method according to claim 1 run continuously.

7. A method according to claim 1 wherein the concentration of said chromic acid in said solution exceed its saturation limit, and said chromic acid precipitates and is separated from said solution by filtration.

8. A method according to claim 1 wherein the concentration of sodium bichromate in said solution is at least about 65 wt% and said solution is not evaporated to precipitate chromic acid.

9. A method according to claim 1 wherein the concentration of sodium bichromate in said solution does not exceed about 65 wt% and said solution is evaporated to precipitate chromic acid.

10. A method according to claim 9 wherein said solution is evaporated between step (A) and step (B).

11. A method according to claim 9 wherein said solution is evaporated during step (B).

12. A method according to claim 9 wherein said solution is evaporated after step (B).

13. In a method of making chromic acid crystals from a sodium bichromate solution by electrolysis of said solution in an electrolytic cell having an anolyte compartment separated from a catholyte compartment by a membrane, where said solution is the anolyte, the improvement comprising terminating said electrolysis when the bichromate percent conversion of said solution is about 1 to about 48.4, adding sulfuric acid to said solution in an amount from about stoichiometric up to about 30 wt% in excess of stoichiometric, whereby chromic acid crystals precipitate, and separating said crystals from said solution 14. The improvement of claim 13 wherein said bichromate percent conversion is about 1 to about 38.

15. The improvement of claim 13 wherein said bichromate percent conversion is about 5 to about 15.

16. The improvement of claim 13 run continuously.

17. A process for making chromic acid from sodium bichromate comprising
   (A) placing an aqueous solution of sodium bichromate having a sodium bichromate concentration of about 30 wt% up to saturation in the anolyte compartment of an electrolytic cell which has an anolyte compartment separated from a catholyte compartment by a membrane;
   (B) electrolyzing said solution until its bichromate percent conversion is about 5 to about 15;
   (C) removing said solution from said anolyte compartment;
   (D) adding to said solution sulfuric acid in an amount from about stoichiometric to about 30 wt% in excess of stoichiometric, whereby sodium bichromate in said solution is converted into sodium bisulfate and chromic acid and chromic acid precipitates; and
   (E) separating said precipitates from said solution.

18. A method according to claim 16 run continuously.

19. A method according to claim 17 including the additional last step of reacting sodium chromate with said sodium bisulfate to produce sodium bichromate.

* * * * *